United States Patent
Yanai et al.

(10) Patent No.: US 8,508,675 B2
(45) Date of Patent: Aug. 13, 2013

(54) LIQUID CRYSTAL PROJECTOR THAT INCLUDES AN INORGANIC POLARIZER

(75) Inventors: Hiroaki Yanai, Matsumoto (JP); Daisuke Sawaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 13/009,319

(22) Filed: Jan. 19, 2011

(65) Prior Publication Data
US 2011/0181800 A1    Jul. 28, 2011

(30) Foreign Application Priority Data
Jan. 22, 2010   (JP) ................. 2010-011772

(51) Int. Cl.
| | | |
|---|---|---|
| *G02F 1/1335* | (2006.01) | |
| *G03B 21/14* | (2006.01) | |
| *G03B 21/26* | (2006.01) | |

(52) U.S. Cl.
USPC ........... 349/5; 349/8; 349/96; 353/20; 353/34

(58) Field of Classification Search
USPC ................. 349/5, 8, 96, 99, 102; 353/20, 30, 353/31, 34
See application file for complete search history.

(56) References Cited

U.S. PATENT DOCUMENTS

| | | | |
|---|---|---|---|
| 6,251,297 B1 | 6/2001 | Komuro et al. | |
| RE40,397 E * | 6/2008 | Ogawa | 353/31 |
| 2004/0264350 A1 | 12/2004 | Ueki et al. | |
| 2008/0186576 A1 | 8/2008 | Takada | |
| 2011/0170186 A1 | 7/2011 | Sawaki | |
| 2011/0170187 A1 | 7/2011 | Sawaki | |

FOREIGN PATENT DOCUMENTS

| | | |
|---|---|---|
| JP | A-11-183727 | 7/1999 |
| JP | A-2002-372620 | 12/2002 |
| JP | A-2005-37900 | 2/2005 |
| JP | A-2007-148344 | 6/2007 |
| JP | A-2008-216957 | 9/2008 |

\* cited by examiner

*Primary Examiner* — Lucy Chien
*Assistant Examiner* — Paisley L Arendt
(74) *Attorney, Agent, or Firm* — Oliff & Berridge, PLC

(57) ABSTRACT

A liquid crystal projector includes: an illumination system; a liquid crystal optical element; an inorganic polarizer arranged on the emission side of the liquid crystal optical element; and a projection system arranged on the emission side of the inorganic polarizer, the inorganic polarizer includes a substrate, a plurality of reflective layers arranged on the substrate, a dielectric layer formed on each reflective layer, and an inorganic particulate layer formed on the dielectric layer to be shifted in a first direction from a center line that bisects the corresponding reflective layer in a short-side direction, at least one of a optical axis of the illumination system and a optical axis of the projection system is shifted with respect to a center axis of the liquid crystal optical element.

6 Claims, 7 Drawing Sheets

LIQUID CRYSTAL PROJECTOR THAT INCLUDES AN INORGANIC POLARIZER

BACKGROUND

1. Technical Field

The present invention relates to a liquid crystal projector including an inorganic polarizer.

2. Related Art

A liquid crystal projector includes a liquid crystal optical element serving as a light modulation device. A liquid crystal optical element is known in which a liquid crystal layer is sandwiched between a pair of substrates arranged to be opposite each other. Electrodes are formed on the pair of substrates to apply a voltage to the liquid crystal layer. An incidence-side polarizing element and an emission-side polarizing element are respectively arranged on the external sides of the substrates, and predetermined polarized light is incident on and emitted from the liquid crystal layer. Meanwhile, in the liquid crystal projector, in order to obtain a black projected image, it is necessary that the emission-side polarizing element absorbs entire light energy. For this reason, a temperature rise in the emission-side polarizing element is especially noticeable. Thus, for example, a technique is known in which two polarizing elements are arranged on the emission side, an emission pre-polarizing element arranged immediately after a liquid crystal optical element absorbs most light energy, and an emission main polarizing element arranged at the subsequent stage improves the contrast of the projected image. The polarizing element is formed of an inorganic material so as to obtain higher heat resistance. The polarizing element includes a substrate, a reflective layer formed on the substrate, a dielectric layer formed on the reflective layer, and an inorganic particulate layer formed on the dielectric layer (for example, see JP-A-2008-216957).

However, when the polarizing element is used as an emission pre-polarizing element, emitting light is given optical activity depending on the form of arrangement of the inorganic particulate layer. As a result, leakage light intensity from the emission main polarizing element increases and the contrast of the liquid crystal projector is lowered.

SUMMARY

An advantage of some aspects of the invention is to solve at least a part of the problems described above, and the invention can be implemented as the following aspects or application examples.

An application example of the invention provides a liquid crystal projector. The liquid crystal projector includes an illumination system, a liquid crystal optical element configured to modulate a light inputted from the illumination system, an inorganic polarizer arranged on the emission side of the liquid crystal optical element, and a projection system arranged on the emission side of the inorganic polarizer and configured to project the light modulated by the liquid crystal optical element on a magnified scale. The inorganic polarizer includes a substrate, a plurality of reflective layers arranged at regular intervals on the substrate, a dielectric layer formed on each reflective layer, and an inorganic particulate layer formed on the dielectric layer to be shifted in a first direction from a center line that bisects the corresponding reflective layer in a short-side direction. At least one of an optical axis of the illumination system and an optical axis of the projection system is shifted with respect to a center axis of the liquid crystal optical element.

With this configuration, at least one of the optical axis of the illumination system and the optical axis of the projection system is shifted with respect to the center axis of the liquid crystal optical element, suppressing the lowering of the contrast of the liquid crystal projector.

In the liquid crystal projector according to the application example of the invention, the optical axis of a light source unit of the illumination system may be shifted in the first direction from the center axis of the liquid crystal optical element.

With this configuration, it is possible to increase the amount of light illuminated from the first direction with comparatively small optical activity and to reduce the amount of light illuminated from a second direction with comparatively large optical activity opposite to the first direction. Therefore, it is possible to suppress the lowering of the contrast of the liquid crystal projector.

In the liquid crystal projector according to the application example of the invention, the illumination system may include a multi lens in which a plurality of small lenses are arranged in a rectangle, and a component configured to shield at least two small lenses at the corners of the rectangle, through which the light illuminating the inorganic polarizer passes from a second direction opposite to the first direction, from among a plurality of small lenses.

With this configuration, it is possible to reduce the amount of light illuminated from the second direction with comparatively large optical activity opposite to the first direction, suppressing the lowering of the contrast of the liquid crystal projector.

In the liquid crystal projector according to the application example of the invention, the projection system may be arranged such that the optical axis of the projection system is shifted in the second direction opposite to the first direction from the center axis of the liquid crystal optical element.

With this configuration, the projection system widely catches light transmitted the inorganic polarizer from the first direction with comparatively small optical activity on the inorganic particulate layer, but the projection system does not easily catch light transmitted the inorganic polarizer from the second direction with comparatively large optical activity opposite to the first direction on the inorganic particulate layer, suppressing the lowering of the contrast of the liquid crystal projector.

In the liquid crystal projector according to the application example of the invention, the liquid crystal optical element may be arranged such that a inclination direction of a pretilt of liquid crystal molecules when no voltage is applied is the second direction opposite to the first direction.

With this configuration, light in a more satisfactory polarized state with a small refractive-index phase difference due to the liquid crystal optical element transmits the inorganic polarizing element from the second direction with comparatively large optical activity opposite to the first direction, suppressing the lowering of the contrast of the liquid crystal projector.

In the liquid crystal projector according to the application example of the invention, the illumination system may include a multi lens in which a plurality of small lenses are arranged in a rectangle, and a superimposing lens configured to input partial light beams from a plurality of small lenses to be superimposed on a target illumination area. A optical axis of the superimposing lens may be shifted in a second direction opposite to the first direction from the optical axis of the light source unit.

With this configuration, when the optical axis of the superimposing lens is shifted, there can be an unnecessary portion of the superimposing lens where light does not transmit. This portion is cut to form an asymmetric lens with respect to the optical axis, reducing the cost of materials and saving space.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
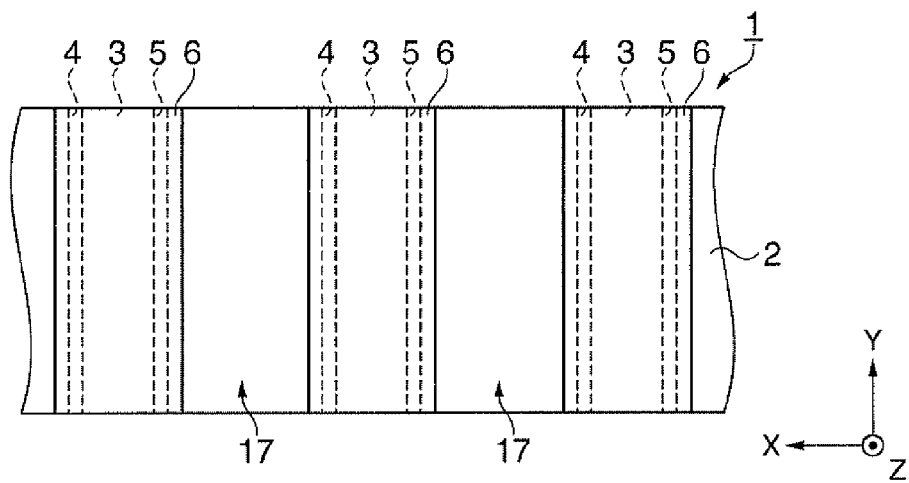
FIGS. 1A to 1C are schematic views showing the configuration of an inorganic polarizer according to a first embodiment.

Hereinafter, a first embodiment in which the invention is embodied will be described with reference to the drawings. In the drawings, the scale of each member has been adjusted so as to be recognizable.

Figure 1B:
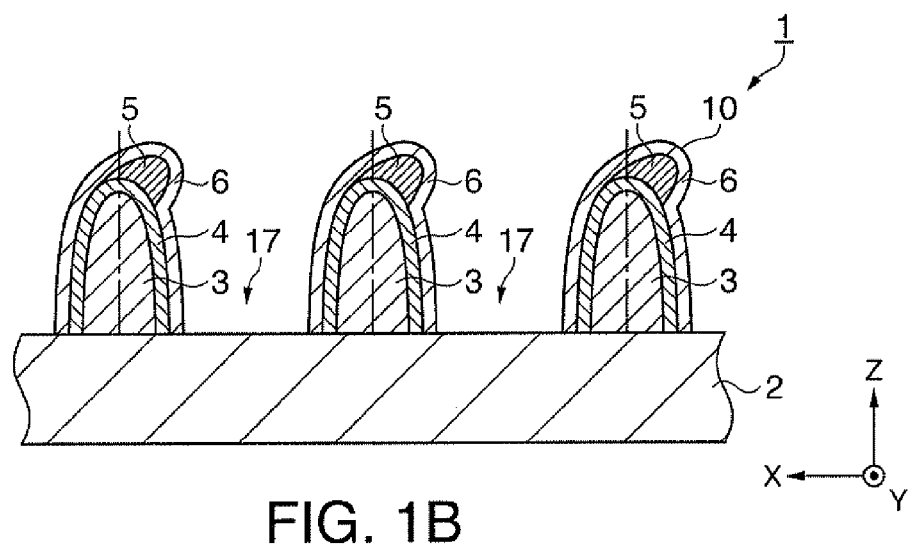
Figure 1C:
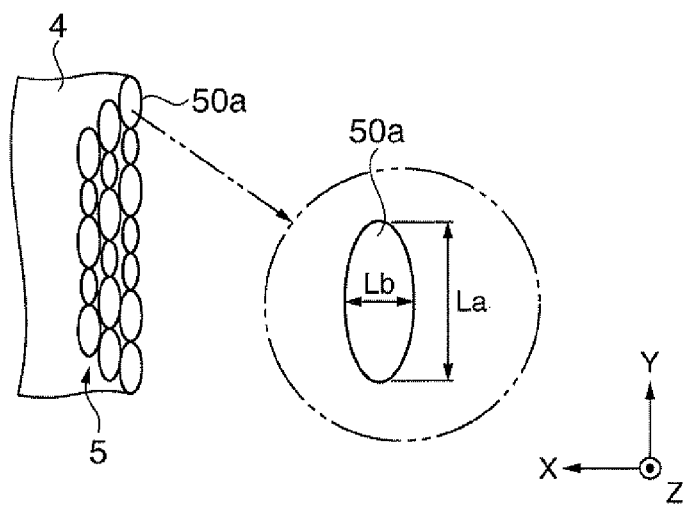

First, the configuration of an inorganic polarizer of the first embodiment will be described. FIGS. 1A to 1C show the configuration of the inorganic polarizer. FIG. 1A is a plan view, FIG. 1B is a sectional view, and FIG. 1C is a partial enlarged view of an inorganic particulate layer 5. As shown in FIG. 1, an inorganic polarizer 1 includes a substrate 2, reflective layers 3 in which a plurality of strip-shaped thin films having a longitudinal direction and a short-side direction perpendicular to each other are arranged at regular intervals in the short-side direction on the substrate 2, a dielectric layer 4 which is formed on each reflective layer 3, and an inorganic particulate layer 5 which is formed of inorganic particulates 50a having shape anisotropy on the dielectric layer 4. The shape anisotropy means that the length La of the particulate size in the longitudinal direction of each strip-shaped reflective layer 3 is greater than the length Lb of the particulate size in the short-side direction perpendicular to the longitudinal direction. The inorganic particulate layer 5 has a convex portion 10 which is shifted in the first direction from a center line, which bisects the corresponding reflective layer 3 in the short-side direction. In the following description, the XYZ coordinate system is set and the positional relationship between the respective members is described with reference to the XYZ coordinate system. In this embodiment, the arrangement axis of the reflective layers 3 is referred to as the X-axis direction, the extension direction of the reflective layers 3 is referred to as the Y-axis direction, and the direction perpendicular to the X-axis direction and the Y-axis direction is referred to as the Z-axis direction.

The substrate 2 is formed of a material which is transparent to light in the use range (in this embodiment, in the visible light range), for example, a transmissive material, such as glass, quartz, sapphire, crystal, or plastic. Depending on the purpose for which the inorganic polarizer 1 is applied, the inorganic polarizer 1 may store heat and be at high temperature. Preferred examples of the material for the substrate 2 include heat-resistant materials, such as glass, quartz, sapphire, and crystal.

As shown in FIG. 1A, a plurality of reflective layers 3 extending in the Y-axis direction are substantially formed on the one surface of the substrate 2 in a stripe shape (strip shape) in plan view. For the reflective layers 3, a reflective material having relatively high reflectance, for example, aluminum (Al), is used. In addition to aluminum, a metal, such as silver, gold, copper, molybdenum, chromium, titanium, nickel, tungsten, iron, silicon, germanium, or tellurium, or a semiconductor material may be used.

The reflective layers 3 are formed at regular intervals in the X-axis direction in a cycle shorter than the wavelength of the visible light range, and a groove portion 17 is formed between adjacent reflective layers 3. For example, the height of each reflective layer 3 is in a range of 20 to 200 nm, and the width of each reflective layer 3 is in a range of 20 to 70 nm. The interval (the width of the groove portion 17 in the X-axis direction) between adjacent reflective layers 3 is in a range of 80 to 130 nm, and the cycle (pitch) is 150 nm. In this way, the reflective layers 3 of the inorganic polarizer 1 have a wire grid structure. Then, linearly polarized light (TE wave) which substantially vibrates in the direction parallel to the extension direction (Y-axis direction) of the reflective layers 3 is reflected (attenuated), and linearly polarized light (TM wave) which substantially vibrates in the direction (X-axis direction) perpendicular to the extension direction of the reflective layers 3 is transmitted.

The dielectric layer 4 is formed of an optical material transparent to visible light, such as $SiO_2$, by a sputtering method or a sol-gel method (for example, a method which coats a sol by a spin coating method and gelates the sol through thermosetting). The dielectric layer 4 is formed as the underlayer of the inorganic particulate layer 5. The dielectric layer 4 is formed so as to adjust the phase of polarized light transmitted the inorganic particulate layer 5 and reflected by the corresponding reflective layer 3 with respect to polarized light reflected by the inorganic particulate layer 5, increasing an interference effect.

As the material for the dielectric layer 4, in addition to $SiO_2$, a general material, such as $Al_2O_3$ or $MgF_2$, may be used. These materials can be formed in the form of a thin film by general vacuum film formation, such as sputtering, a vapor deposition method, or an evaporation method, or by coating and thermosetting a sol-like material on the substrate 2. It is preferable that the refractive index of the dielectric layer 4 is greater than 1 and equal to or smaller than 2.5. The optical characteristics of the inorganic particulate layer 5 are affected by the ambient refractive index, such that the characteristics of the inorganic polarizer can be controlled by a dielectric material.

The inorganic particulate layer 5 is formed on the dielectric layer 4. In this embodiment, as shown in FIG. 1B, the inorganic particulate layer 5 is formed at the apex of the dielectric layer 4.

The inorganic particulate layer 5 is formed of inorganic particulates 50a. As shown in FIG. 1C, the inorganic particulates 50a have shape anisotropy in which the length La of the particulate size in the longitudinal direction (Y-axis direction) of the corresponding reflective layer 3 is greater than the length Lb of the particulate size in the short-side direction (X-axis direction) perpendicular to the longitudinal direction (Y-axis direction) of the corresponding reflective layer 3. With the shape anisotropy, the optical constant can differ between the Y-axis direction (long axis direction) and the X-axis direction (short axis direction). As a result, a predetermined polarization characteristic is obtained such that a polarized light component parallel to the long axis direction is absorbed and a polarized light component parallel to the short axis direction is transmitted. The inorganic particulate layer 5 constituted by the inorganic particulates 50a having shape anisotropy can be formed by rhombic film formation, for example, oblique sputtering film formation or the like.

As the material for the inorganic particulates 50a, an appropriate material is selected depending on the use range as the inorganic polarizer 1. That is, a metal material or a semiconductor material satisfies the condition. Specific examples of the metal material include Al, Ag, Cu, Au, Mo, Cr, Ti, W, Ni, Fe, Si, Ge, Te, and Sn simplexes and alloys containing them. Examples of the semiconductor material include Si, Ge, and Te. A silicide-based material, such as $FeSi_2$ (in particular, $\beta$-$FeSi_2$), $MgSi_2$, $NiSi_2$, $BaSi_2$, $CrSi_2$, or $CoSi_2$, is appropriately used. In particular, as the material for the inorganic particulates 50a, aluminum-based metal particulates made of aluminum or aluminum alloy, or semiconductor particulates containing beta iron silicide, germanium, or tellurium are used, obtaining high contrast in the visible light range. In order to obtain a polarization characteristic in a wavelength range other than visible light, for example, in an infrared range, for the inorganic particulates 50a constituting the inorganic particulate layer 5, the particulates of Ag (silver), Cu (copper), Au (gold), or the like are appropriately used. This is because the resonance wavelength of such a metal in the long axis direction is around the infrared range. In addition, a material, such as molybdenum, chromium, titanium, tungsten, nickel, iron, or silicon, may be used depending on the use range.

In this embodiment, in the inorganic particulate layer 5, a convex portion 10 is formed only on one side of the center line, which bisects the corresponding reflective layer 3, in sectional view perpendicular to the longitudinal direction (Y-axis direction) of the reflective layer 3 (in sectional view of the X-axis direction). That is, as shown in FIG. 1B, the inorganic particulate layer 5 is formed to be shifted in the short-side direction (X-axis direction) of the reflective layer 3, specifically, in the negative X-axis direction. In other words, when the reflective layer 3 is bisected in the Y-axis direction, the volume of the inorganic particulate layer 5 on the reflective layer 3 in the negative X-axis direction is greater than the volume of the inorganic particulate layer 5 on the reflective layer 3 in the positive X-axis direction. In FIG. 1B, the negative X-axis direction is defined as a first direction.

A protective layer 6 is formed on the inorganic particulate layer 5. For the protective layer 6, a general material, such as $SiO_2$, $Al_2O_3$, or $MgF_2$, may be used. These materials can be formed in the form of a thin film by general vacuum film formation, such as sputtering, a vapor deposition method, or an evaporation method, or by coating and thermosetting a sol-like material on the substrate 2.

Thus, the inorganic polarizer 1 of this embodiment includes the substrate 2 which is transparent to visible light, the reflective layers 3 in which strip-shaped thin films made of metal extend at regular intervals on the substrate 2, the dielectric layer 4 which is formed on each reflective layer 3, and the inorganic particulate layer 5 in which the inorganic particulates 50a are arranged linearly. The inorganic particulate layer 5 is formed in parallel on the dielectric layer 4 at a position corresponding to the reflective layer 3 and has a wire grid structure with the same direction as the direction, in which the inorganic particulates 50a are arranged linearly, as the longitudinal direction. The inorganic particulates 50a have shape anisotropy such that the diameter of the inorganic particulates 50a in the arrangement direction is long and the diameter of the inorganic particulates 50a in the direction perpendicular to the arrangement direction is short. The inorganic particulate layer 5 has the convex portion 10 only in the first direction.

Figure 2A:
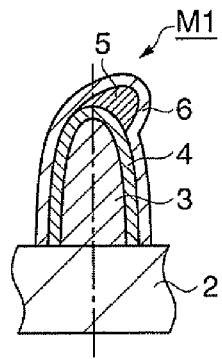
FIGS. 2A to 2C are explanatory view showing the form of the inorganic polarizer and leakage light intensity characteristics according to the first embodiment.
Figure 2B:
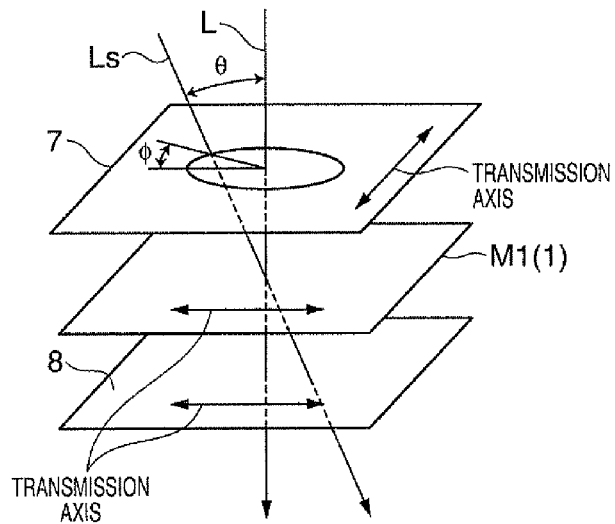
Figure 2C:
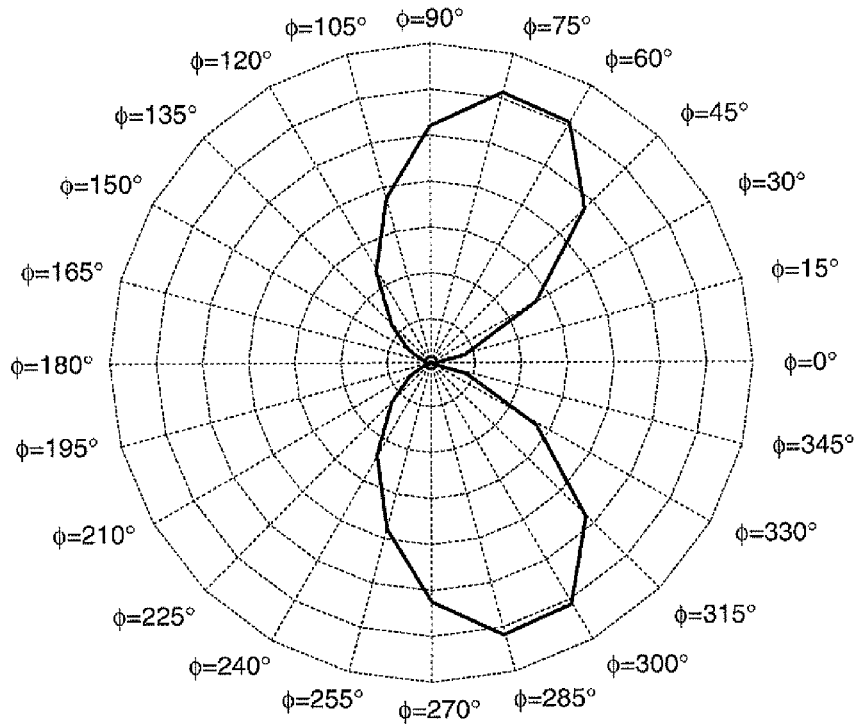

Description will be provided as to the relationship between the form of the inorganic particulate layer 5 and the leakage light intensity from the emission main polarizing element when the inorganic polarizer 1 is used as an emission pre-polarizing element. FIGS. 2A to 2C are explanatory views showing the form of the inorganic polarizer and the leakage light intensity characteristics.

FIG. 2A shows a modeled inorganic polarizer for obtaining the leakage light intensity characteristics through a simulation. In this simulation, a model M1 shown in FIG. 2A is used. In this simulation, the reflective layer 3 has a width of 45 nm and a height of 60 nm, and the dielectric layer 4 has a thickness of 10 nm. The cycle is 150 nm. The materials for the substrate 2, the reflective layer 3, the dielectric layer 4, and the inorganic particulate layer 5 are respectively, $SiO_2$, aluminum, $SiO_2$, and amorphous silicon.

FIG. 2B shows the model arrangement for a simulation of the inorganic polarizer including the model M1. As shown in FIG. 2B, an incidence-side polarizing element 7 is arranged on the light incidence side and an emission main polarizing element 8 is arranged on the light emission side so as to be perpendicular to the optical axis L of incident light. The incidence-side polarizing element 7 and the emission main polarizing element 8 are maintained in crossed nicols assuming that the elements are ideal absorption polarizing elements. The model M1 is arranged as the inorganic polarizer 1 between the incidence-side polarizing element 7 and the emission main polarizing element 8. The model M1 is maintained in a parallel nicols state with the emission main polarizing element 8. In this simulation, illumination light of a liquid crystal projector is taken into consideration, and oblique incident light is defined with the elevation angle θ and the rotation angle φ with respect to the optical axis L. Although in an actual liquid crystal projector, the liquid crystal optical element is arranged between the incidence-side polarizing element 7 and the model M1 as the inorganic polarizer 1, in order to clarify the characteristics of the model M1 as the inorganic polarizer 1, in this simulation, the liquid crystal optical element is omitted.

FIG. 2C shows the result of the emitting light intensity from the emission main polarizing element 8 at the rotation angle φ with respect to the optical axis L for the model M1. In the calculation, while θ=5° is set and φ is changed in a range of 0° to 345° by 15°, the leakage light intensity at each φ is obtained. In the drawing, φ=0° and 180° are within the X-Z plane of the coordinate system shown in FIGS. 1A to 1C. φ=0° corresponds to incident light from a second direction which is the positive X-axis direction with no inorganic particulate layer 5, and φ=180° corresponds to incident light from the first direction which is the negative X-axis direction with the inorganic particulate layer 5. From FIG. 2C, it can be understood that the symmetry between a first quadrant and a second quadrant and between a third quadrant and a fourth quadrant is collapsed, and the leakage light intensity (φ=270° to 345° and 0° to 90°) by incident light from the second direction is very much greater than the leakage light intensity (φ=180±90°) by incident light from the first direction. This is considered because, as understood from FIG. 2A, the left-right symmetry of the structure is collapsed, and the optical axis within the section is inclined from the Z-axis direction, increasing optical activity with respect to oblique incident light.

In addition to the above-described simulation of oblique incident light at θ=5°, the same simulation is done for oblique incident light at θ=10° and θ=20°. As a result, as in the above description, the leakage light intensity by incident light from the second direction is greater than incident light from the first direction.

In the inorganic polarizer 1 of this embodiment configured as above, the front surface of the substrate 2, that is, the forming surface of the strip-shaped reflective layer 3, the dielectric layer 4, and the inorganic particulate layer 5 becomes a light incidence surface. Then, with the use of four operations of light transmission, reflection, interference, and selective light absorption of polarized waves by optical anisotropy, the inorganic polarizer 1 attenuates linearly polarized light (TE wave (S wave)) which substantially vibrates in the direction parallel to the extension direction (Y-axis direction or longitudinal direction) of the reflective layer 3, and transmits linearly polarized light (TM wave (P wave)) which substantially vibrates in the direction (X-axis direction or short-side direction) perpendicular to the extension direction of the reflective layer 3. That is, the TE wave is attenuated by the light absorption operation of the inorganic particulate layer 5. The reflective layer 3 functions as a wire grid and reflects the TE wave transmitted the inorganic particulate layer 5 and the dielectric layer 4. The TE wave reflected by the reflective layer 3 interferes with the TE wave reflected by the inorganic particulate layer 5 and is attenuated. Thus, it is possible to selectively attenuate the TE wave.

Next, a method of manufacturing an inorganic polarizer of the first embodiment will be described. FIGS. 3A to 3D are process views showing a method of manufacturing an inorganic polarizer. A method of manufacturing the inorganic polarizer 1 of this embodiment includes a reflective layer forming step of forming, on the substrate 2, a plurality of strip-shaped reflective layers 3 which have a longitudinal direction and a short-side direction perpendicular to each other and are arranged at regular intervals in the short-side direction, a dielectric layer forming step of forming the dielectric layer 4 on each of the reflective layer 3, and an inorganic particulate layer forming step of forming the inorganic particulates 50a having shape anisotropy, such that the length of the particulate size in the longitudinal direction of the reflective layer 3 is greater than the length of the particulate size in the short-side direction of the reflective layer 3, on the dielectric layer 4 to form the inorganic particulate layer 5 having the convex portion 10 shifted to the first direction from the center line, which bisects the reflective layer 3 in the short-side direction, and a protective layer forming step of forming the protective layer 6 on the inorganic particulate layer 5. Hereinafter, description will be provided with reference to the drawings.

Figure 3A:
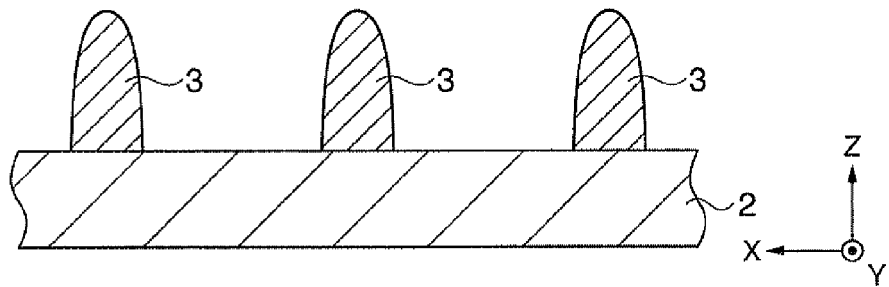
FIGS. 3A to 3D are process views showing a method of manufacturing an inorganic polarizer according to the first embodiment.

In the reflective layer forming step of FIG. 3A, the reflective layers 3 are formed on the substrate 2. For example, the reflective layers 3 are formed through patterning of a metal film, such as aluminum, using a photolithography method.

Figure 3B:
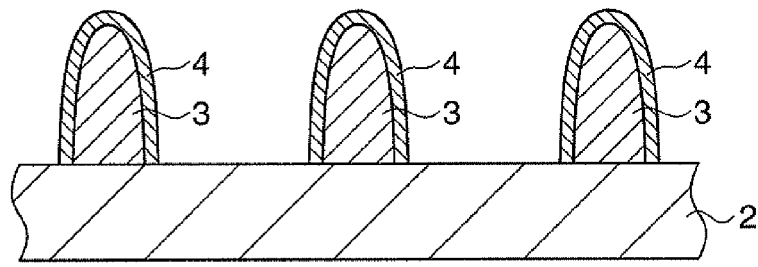

In the dielectric layer forming step of FIG. 3B, the dielectric layer 4 is formed on each reflective layer 3. For example, the dielectric layer 4 made of $SiO_2$ or the like is formed by a sputtering method or a sol-gel method.

Figure 3C:
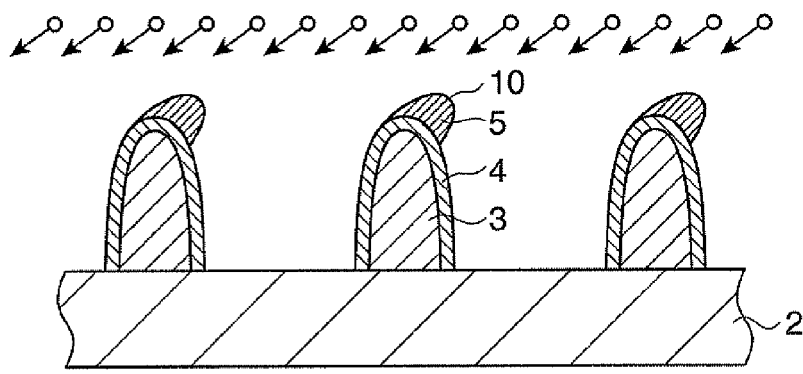

In the inorganic particulate layer forming step of FIG. 3C, the inorganic particulate layer 5 is formed rhombically from one reflective layer 3 of adjacent reflective layers 3 and has the convex portion 10 which is rhombic toward the one reflective layer 3. Specifically, for example, sputter particles are deposited from an oblique direction with respect to the substrate 2, on which the reflective layers 3 is formed, using a sputtering apparatus to form the inorganic particulate layer 5. In FIG. 3C, the incidence direction of the sputter particles is indicated by an arrow. The rhombic angle of rhombic film formation to the surface of the substrate 2 can be appropriately set in a range of 0 to 50°. The arrow indicating the incidence direction of the sputter particles represents the incidence direction of light which escapes from the inorganic particulate layer 5 to the reflective layer 3, and thus refers to the incidence from the first direction.

In the above-described inorganic particulate layer forming step, the inorganic particulates 50a are formed on the dielectric layer 4 by the above-described rhombic film formation to have shape anisotropy such that the length La of the particulate size in the longitudinal direction of the reflective layer 3 is greater than the length Lb of the particulate size in the short-side direction perpendicular to the longitudinal direction of the reflective layer 3 (see FIG. 1C).

Figure 3D:
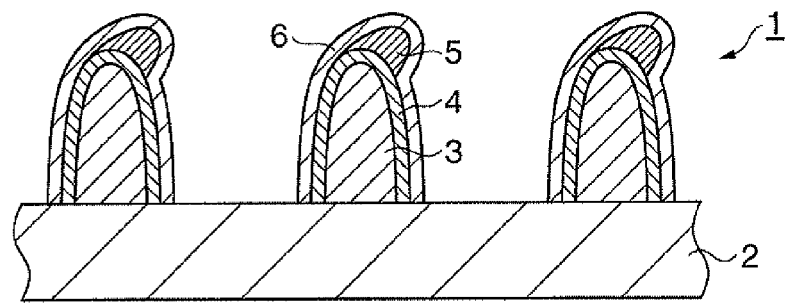

In the protective layer forming step of FIG. 3D, the protective layer 6 is formed on the inorganic particulate layer 5. The protective layer 6 is formed of, for example, $SiO_2$ by a sputtering method. Through the above-described steps, it is possible to manufacture the inorganic polarizer 1.

Figure 4:
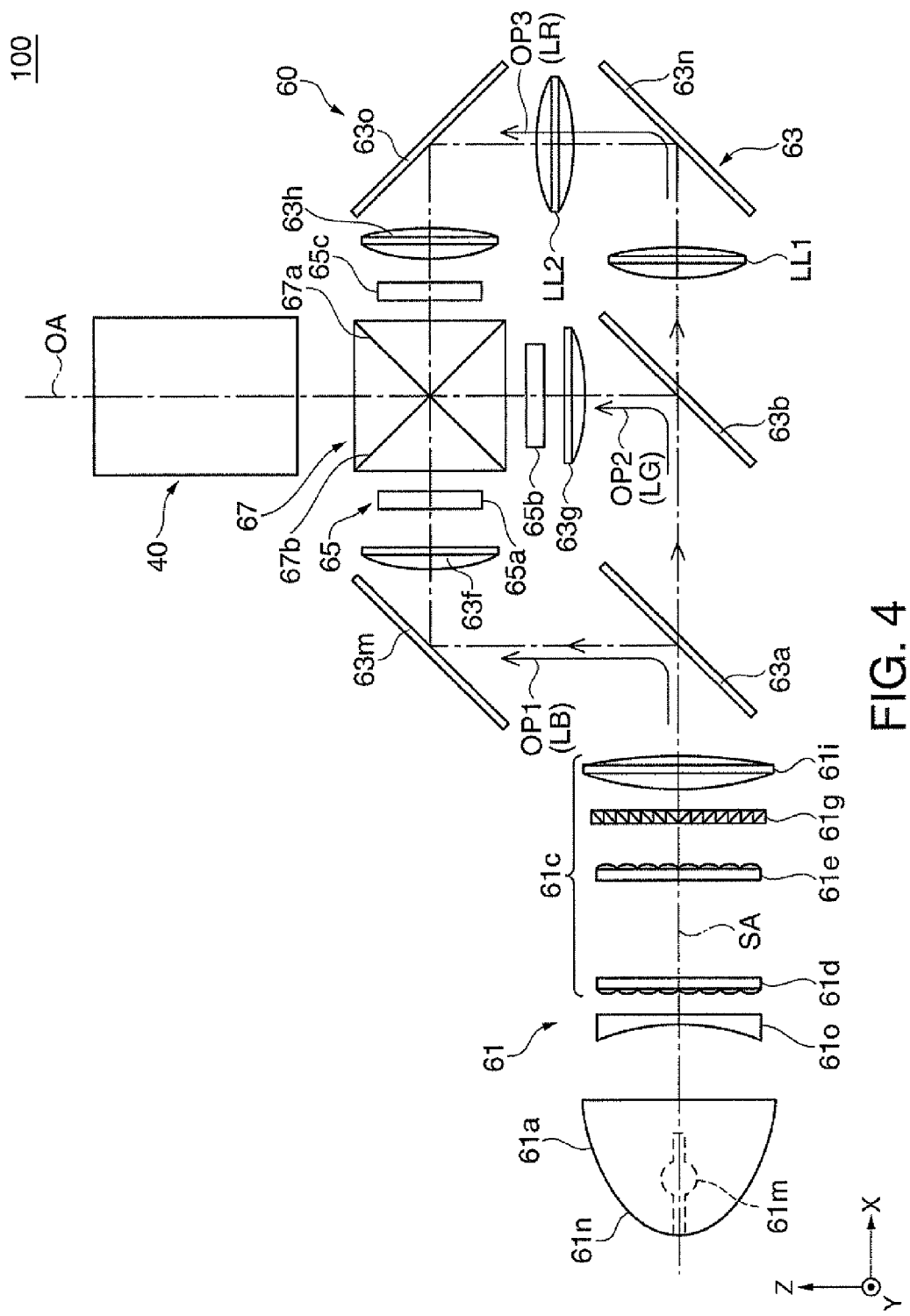
FIG. 4 is a schematic view showing the configuration of a liquid crystal projector according to the first embodiment.

Next, the configuration of a liquid crystal projector of the first embodiment will be described. FIG. 4 is a schematic view showing the configuration of a liquid crystal projector. A liquid crystal projector 100 includes an image formation optical section 60, an illumination system 61, and a projection system 40.

The image formation optical section 60 includes a color separation optical system 63 which separates illumination light emitted from the illumination system 61 into three color light components of red, green, and blue, a light modulation device 65 which is illuminated with illumination light of the respective colors emitted from the color separation optical system 63, and a cross dichroic prism 67 which combines modulated light of the respective colors having passed through the light modulation device 65.

The illumination system 61 includes a light source unit 61a which emits light source light, and a homogenization optical system 61c which converts light source light emitted from the light source unit 61a to illumination light which is homogeneously arranged in a predetermined polarization direction. The light source unit 61a has a light source lamp 61m and a reflector 61n. The reflector 61n is an elliptical reflector and has a concave lens 61o which substantially parallelizes light source light. The reflector 61n may be a parabolic reflector. In this case, the concave lens 61o may not be provided.

The homogenization optical system 61c includes a first multi lens 61d in which a plurality of small lenses are arranged in a rectangle to divide the light beam of light source light into partial light beams, a second multi lens 61e which regulates the spread of the divided partial light beams and has a plurality of small lenses corresponding to a plurality of small lenses of the first multi lens 61d, a polarization conversion device 61g which arranges the polarization directions of the partial light beams, and a superimposing lens 61i which inputs the partial light beams to be superimposed on a target illumination area.

The color separation optical system 63 includes first and second dichroic mirrors 63a and 63b, and optical path diffraction mirrors 63m, 63n, and 63o. A system optical axis SA corresponding to the center axis of a light beam from the illumination system 61 to the projection system 40 is branched off into three optical paths OP1 to OP3, thereby dividing illumination light into three light beams of a blue light component LB, a green light component LG, and a red light component LR. Relay lenses LL1 and LL2 substantially transfer an image formed immediately before the incidence-side first relay lens LL1 to an emission-side field lens 63h unchanged, preventing the lowering of use efficiency of light due to light diffusion or the like.

The light modulation device 65 includes three liquid crystal devices 65a, 65b, and 65c to which the three light beams, that is, the blue light component LB, the green light component LG, and the red light component LR are respectively input, and performs intensity modulation for the blue light component LB, the green light component LG, and the red light component LR respectively input to the liquid crystal devices 65a, 65b, and 65c through the field lenses 63f, 63g, and 63h in terms of pixels in accordance with a driving signal.

Figure 5:
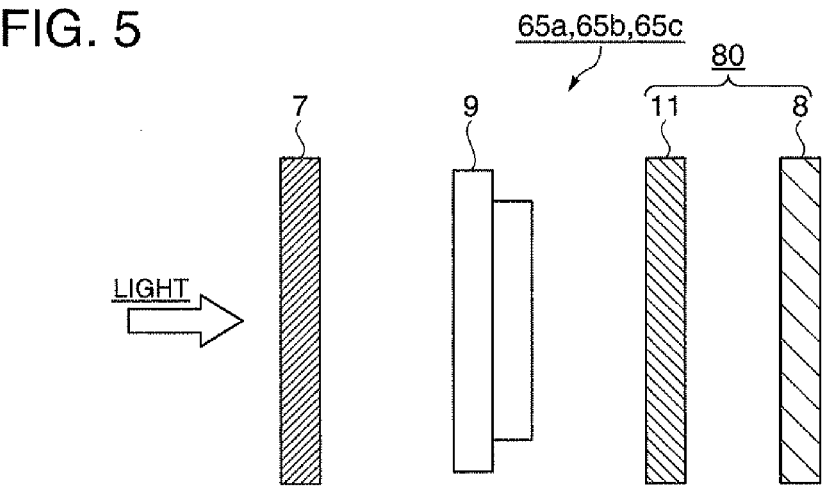
FIG. 5 is a schematic view showing the configuration of a liquid crystal device in the liquid crystal projector according to the first embodiment.

As shown in FIG. 5, each of the liquid crystal devices 65a, 65b, and 65c is an image forming element in which the liquid crystal optical element 9 is sandwiched between the incidence-side polarizing element 7 and an emission polarizing element 80. The emission polarizing element 80 may be constituted by two elements of the emission main polarizing element 8 and an emission pre-polarizing element 11. The inorganic polarizer 1 shown in FIGS. 1A to 3D corresponds to the emission pre-polarizing element 11.

As shown in FIG. 4, the cross dichroic prism 67 includes dichroic films 67a and 67b which intersect each other, and emits image light obtained by combining modulated light from the liquid crystal devices 65a, 65b, and 65c.

The projection system 40 projects light combined by the cross dichroic prism 67 as a color image on the screen on an appropriate magnified scale with comparatively small aberration.

Figure 6A:
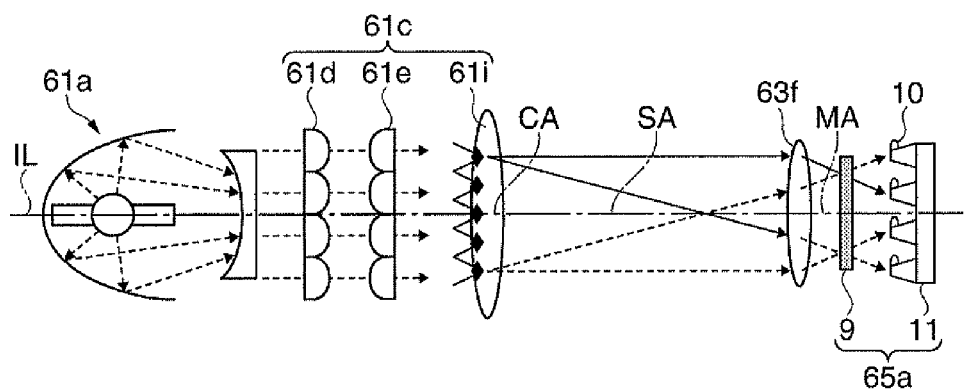
FIGS. 6A and 6B are schematic views showing the arrangement of an illumination system and a light modulation device in the liquid crystal projector according to the first embodiment.
Figure 6B:
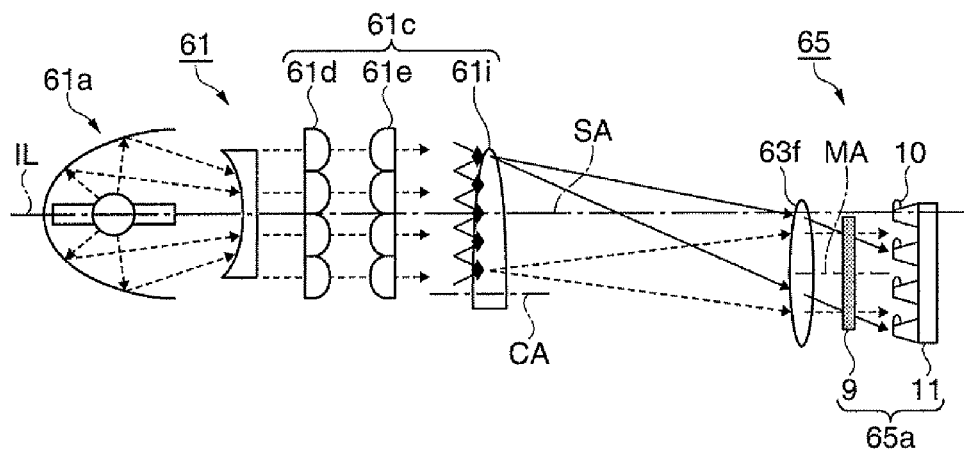

Next, the positional relationship between the illumination system 61 of the first embodiment and the light modulation device 65 will be described. FIGS. 6A and 6B are schematic views showing the positional relationship between the illumination system 61 and the light modulation device 65. In FIGS. 6A and 6B, for simplification of description, the color separation optical system 63, the projection system 40, and the like are omitted. FIG. 6A shows an illumination system of a comparative example, and FIG. 6B is the illumination system of this embodiment.

As shown in FIG. 6A, in the illumination system of the comparative example, an optical axis IL which passes through the center of a light source unit 61a is aligned with a center axis MA which passes through the center of the liquid crystal area of a liquid crystal optical element 9, and light from a convex portion 10 of an emission pre-polarizing element 11 is substantially the same level as light from the opposite side of the convex portion 10 of the emission pre-polarizing element 11 with a large lowering of contrast.

Meanwhile, as shown in FIG. 6B, in the illumination system 61 of this embodiment, the optical axis IL which is aligned with the system optical axis SA passing through the center of the light source unit 61a is shifted in the first direction, in which the convex portion 10 is arranged on the reflective layer 3 of the emission pre-polarizing element 11, with respect to the center axis MA which is parallel to the system optical axis SA passing through the center of the liquid crystal area of the liquid crystal optical element 9. With this configuration, with regard to light which is incident on the emission pre-polarizing element 11, the ratio of light which is incident obliquely from the first direction increases. That is, with regard to light which is incident on the emission pre-polarizing element 11, the ratio of light which is incident from the second direction opposite to the side on which the convex portion 10 is arranged on the reflective layer 3 of the emission pre-polarizing element 11 and causes the lowering of contrast is small, suppressing the lowering of contrast of the liquid crystal projector 100.

In this embodiment, the angular distribution of illumination light is shifted to correspond to the characteristics of the emission pre-polarizing element 11. Thus, as shown in FIG. 6B, a method in which the optical axis IL passing through the center of the light source unit 61a is deviated from the optical axis CA of the superimposing lens 61i is taken into consideration. At this time, an unnecessary portion of the superimposing lens 61i where light is not transmitted is cut to form an asymmetric lens with respect to the optical axis CA, reducing the cost of materials and saving space.

Although in FIGS. 6A and 6B, the liquid crystal device 65a has been described as an example, the same can be applied to any one of the liquid crystal devices 65a, 65b, and 65c.

Second Embodiment

Hereinafter, the configuration of a liquid crystal projector according to a second embodiment of the invention will be described. The liquid crystal projector of the second embodiment is obtained by changing a portion of the liquid crystal projector of the first embodiment, and the portions which are not particularly described are the same as those in the first embodiment.

Figure 7:
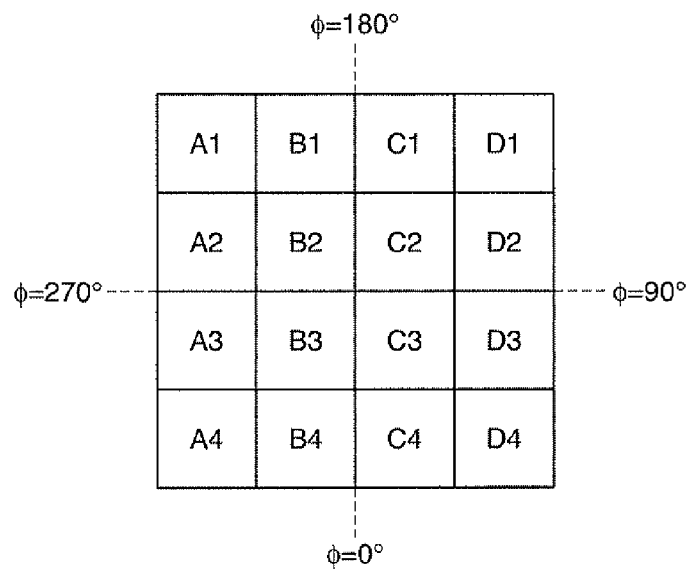
FIG. 7 is a schematic view showing a light-shielding portion of an illumination system in a liquid crystal projector according to a second embodiment.

Description will be provided as to the shielding of the illumination system 61 of the second embodiment. FIG. 7 is a schematic view showing the first multi lens 61d constituting the illumination system 61. FIG. 7 is a front view when the first multi lens 61d is viewed from the light source unit 61a side. φ is an azimuth angle which is defined on the basis of the emission pre-polarizing element 11. Light which passes through cells A1, B1, C1, and D1 at φ=180°±90° becomes illumination light which is incident on the emission pre-polarizing element 11 from the first direction, and light which passes through cells A4, B4, C4, and D4 at φ=0° to 90° and 270° to 360° becomes illumination light which is incident on the emission pre-polarizing element 11 from the second direction. The leakage light intensity depending on the azimuth angle of light which is incident on the emission pre-polarizing element 11 is as described above with reference to FIG. 2C in the first embodiment.

In order to suppress the lowering of contrast of the liquid crystal projector, it is necessary to shield light which is incident from the second direction. However, if a portion of the illumination system 61 is shielded, the brightness of the liquid crystal projector is lowered in proportion to the shield amount. Thus, it is preferable that the shield area is a minimum requirement. From the viewpoint of achieving maximum efficiency in suppressing the lowering of contrast of the liquid crystal projector, it is preferable to shield the cells A4 and D4 at the corners corresponding to illumination light, which is incident on the emission pre-polarizing element 11 at φ=45° and φ=315° with the highest leakage light intensity, from among the cells A4, B4, C4, and D4 through which light incident on the emission pre-polarizing element 11 from the second direction passes. If the cells A4 and D4 are shielded, illumination light which is incident on the emission pre-polarizing element 11 with a large lowering of contrast at φ=45° and φ=315° can be reduced, suppressing the lowering of contrast without degrading the brightness of the liquid crystal projector.

In order to shield the cells at the corners, a light-shielding plate or a stop having a circular, rhombic, trapezoidal, cross, or chevron opening may be used.

Although in FIG. 7, the first multi lens 61d has been described as an example, the same effects are obtained in the second multi lens 61e. Although a case has been described where the number of cells is 4×4, that is, 16, the invention is not limited thereto. The cells to be shielded may be increased to A4, B4, C4, and D4 depending on the use conditions.

With regard to the illumination system 61, the same illumination system 61 as in the first embodiment may be used, or the illumination system of the comparative example which has been described in the first embodiment may be used.

Third Embodiment

Hereinafter, the configuration of a liquid crystal projector according to a third embodiment of the invention will be described. The liquid crystal projector of the third embodiment is obtained by changing a portion of the liquid crystal projector of the first embodiment, and the portions which are not particularly described are the same as those in the first embodiment.

Figure 8:
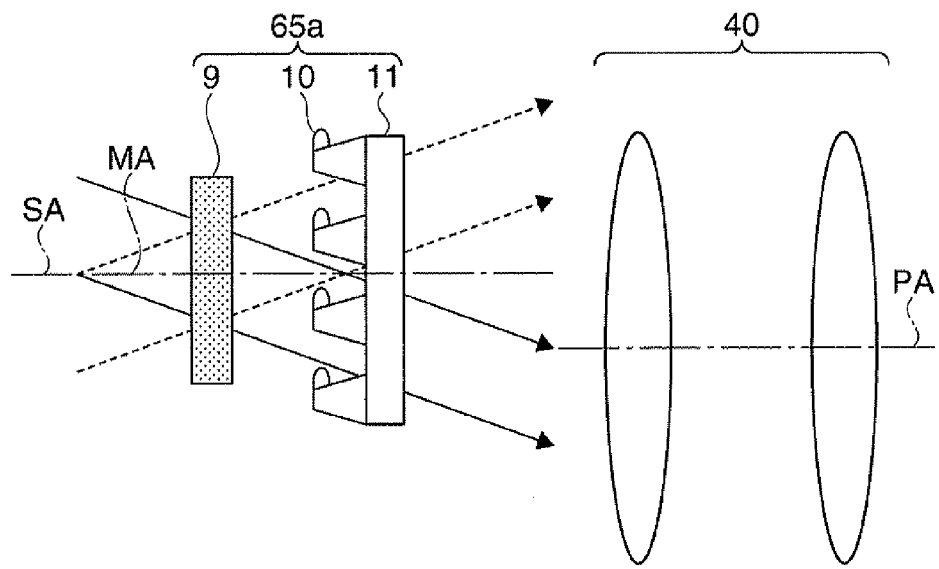
FIG. 8 is a schematic view showing the arrangement of a projection system and a light modulation device in a liquid crystal projector according to a third embodiment.

Description will be provided as to the positional relationship between the projection system 40 and the light modulation device 65 of the third embodiment. FIG. 8 is a schematic view showing the positional relationship between the projection system 40 and the liquid crystal device 65a which is a portion of the light modulation device. The liquid crystal device 65a has the liquid crystal optical element 9 and the emission pre-polarizing element 11.

As shown in FIG. 8, an optical axis PA which connects the apexes of a lens group constituting the projection system 40 is shifted in the second direction opposite to the side, on which the convex portion 10 is arranged on the reflective layer 3 of the emission pre-polarizing element 11, with respect to the center axis MA which is parallel to the system optical axis SA passing through the center of the liquid crystal area of the liquid crystal optical element 9. Thus, light which is incident on and transmits the emission pre-polarizing element 11 from the second direction opposite to the side, on which the convex portion 10 is arranged on the reflective layer 3 of the emission pre-polarizing element 11 with a large lowering of contrast can be reduced, suppressing the lowering of contrast of the liquid crystal projector.

Although in FIG. 8, the liquid crystal device 65a has been described as an example, the same can be applied to any one of the liquid crystal devices 65a, 65b, and 65c, and can also be applied to a plurality of liquid crystal devices.

With regard to the illumination system 61, the same illumination system 61 as in the first embodiment may be used, or the illumination system of the comparative example which has been described in the first embodiment may be used.

Fourth Embodiment

Hereinafter, the configuration of a liquid crystal projector according to a fourth embodiment of the invention will be described. The liquid crystal projector of the fourth embodiment is obtained by changing a portion of the liquid crystal projector of the first embodiment, and the portions which are not particularly described are the same as those in the first embodiment.

Figure 9A:
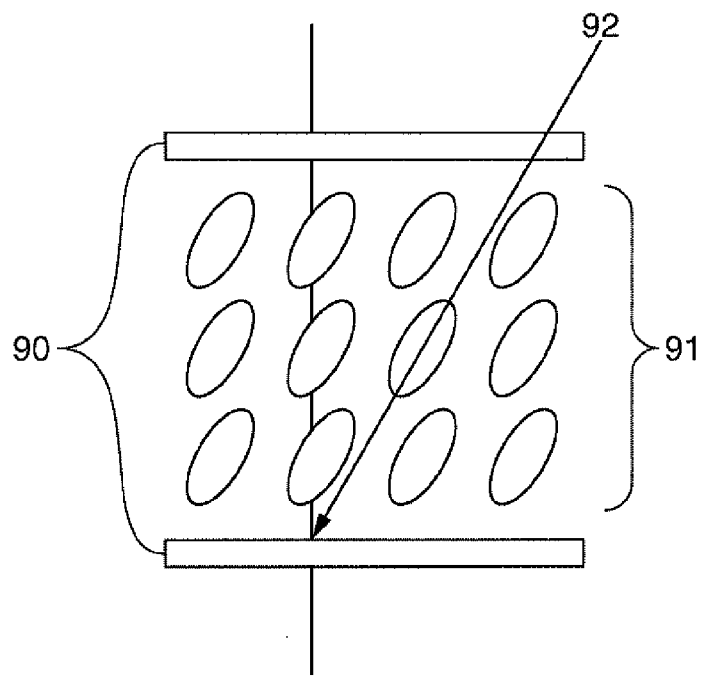
FIGS. 9A and 9B are schematic views showing a liquid crystal optical element in a liquid crystal projector according to a fourth embodiment.
Figure 9B:
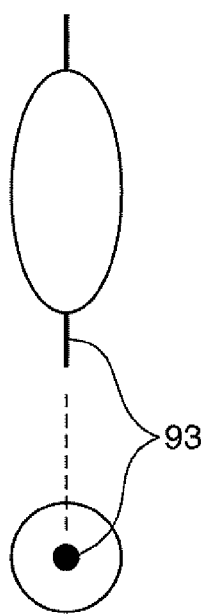

Description will be provided as to the positional relationship between the liquid crystal optical element 9 and the emission pre-polarizing element 11 of the fourth embodiment. FIGS. 9A and 9B are schematic views showing the structure of the liquid crystal optical element 9 constituting the liquid crystal device 65a.

FIG. 9A shows the vertically aligned state of the liquid crystal optical element 9 when no voltage is applied. As shown in FIG. 9A, the liquid crystal optical element 9 includes a pair of alignment films 90, and a plurality of liquid crystal molecules 91 which are sandwiched between the pair of alignment films 90 and regularly arranged. In the vertically aligned liquid crystal optical element 9, the alignment films 90 are formed such that the liquid crystal molecules 91 are inclined in a predetermined direction when a voltage is applied. Thus, even when no voltage is applied with a minimum phase difference, the liquid crystal molecules 91 have a pretilt 92 which is an initial inclination. The liquid crystal molecules 91 have birefringence. When being expressed by a refractive-index ellipsoid, the liquid crystal molecules 91 are a uniaxial ellipsoid which is point-symmetric with respect to a center axis 93 shown in FIG. 9B. For this reason, there is a difference in the phase difference depending on the light incidence direction, but the phase difference of the liquid crystal optical element 9 is minimized with respect to incident light from the direction of the pretilt 92 which is the same as the center axis 93.

Meanwhile, when a substrate having birefringence, such as crystal or sapphire, is used within an optical system, in order to minimize the effect of birefringence, it is common to align the polarization axis of incident light with the optical axis of the birefringent substrate. Similarly, with regard to the emission pre-polarizing element 11 (inorganic polarizer 1), it is preferable that the polarization state of incident light from the second direction with a large phase difference in the emission pre-polarizing element 11 is close to linearly polarized light. Thus, when no voltage is applied, in the liquid crystal optical element 9, the relative positions of the liquid crystal optical element 9 and the emission pre-polarizing element 11 are set such that the azimuth angle of the pretilt 92 becomes φ=0 to 90° and φ=270 to 360° as the second direction while giving as little phase difference to linearly polarized light passing through the liquid crystal optical element 9 as possible. Therefore, it is possible to prevent an increase in the leakage light intensity from the liquid crystal device 65a when no voltage is applied and to suppress the lowering of contrast of the liquid crystal projector.

Although in the fourth embodiment, the liquid crystal device 65a has been described as an example, the same can be applied to any one of the liquid crystal devices 65a, 65b, and 65c, and can also be applied to a plurality of liquid crystal devices.

With regard to the illumination system 61, the same illumination system 61 as in the first embodiment may be used, or the illumination system of the comparative example which has been described in the first embodiment may be used.

The invention is not limited to the above-described embodiments, only one of the first to fourth embodiments may be applied to the liquid crystal projector 100, or a plurality of embodiments may be applied to the liquid crystal projector 100 simultaneously.

As the liquid crystal projector, there are a liquid crystal projector which projects an image from a direction in which the projection surface is observed, and a liquid crystal projector in which an image is projected from a direction opposite to the direction in which the projection surface is observed. The configuration of the liquid crystal projector of the invention can be applied to any one of these liquid crystal projectors.

The present application claims priority and incorporates by reference in its entirety Japanese Patent Application No. 2010-011772 filed Jan. 22, 2010.

What is claimed is:

1. A liquid crystal projector comprising:
an illumination system;
a liquid crystal optical element configured to modulate a light inputted from the illumination system;
an inorganic polarizer arranged on an emission side of the liquid crystal optical element; and
a projection system arranged on an emission side of the inorganic polarizer and configured to project the light modulated by the liquid crystal optical element on a magnified scale,
the inorganic polarizer includes
a substrate,
a plurality of reflective layers arranged at regular intervals on the substrate,
a dielectric layer formed on each reflective layer, and
an inorganic particulate layer formed on the dielectric layer to be shifted in a first direction from a center line that bisects the corresponding reflective layer in a short-side direction,
at least one of an optical axis of the illumination system and an optical axis of the projection system is shifted with respect to a center axis of the liquid crystal optical element, and
the projection system is arranged such that the optical axis of the projection system is shifted in a second direction opposite to the first direction from the center axis of the liquid crystal optical element.

2. The liquid crystal projector according to claim 1, wherein an optical axis of a light source unit of the illumination system is shifted in the first direction from the center axis of the liquid crystal optical element.

3. The liquid crystal projector according to claim 2, wherein the illumination system includes
a multi lens in which a plurality of small lenses are arranged in a rectangle, and
a component configured to shield at least two small lenses at the corners of the rectangle, through which the light illuminating the inorganic polarizer passes from the second direction opposite to the first direction, from among a plurality of small lenses.

4. The liquid crystal projector according to claim 2, wherein the liquid crystal optical element is arranged such that an inclination direction of a pretilt of liquid crystal molecules when no voltage is applied is the second direction opposite to the first direction.

5. The liquid crystal projector according to claim 2, wherein the illumination system includes
a multi lens in which a plurality of small lenses are arranged in a rectangle, and
a superimposing lens configured to input partial light beams from a plurality of small lenses to be superimposed on a target illumination area, and
a optical axis of the superimposing lens is shifted in the second direction opposite to the first direction from the optical axis of the light source unit.

6. The liquid crystal projector according to claim 1, wherein a front surface of the substrate, on which the reflective layers, the dielectric layers and the inorganic particulate layers are formed, is a light incidence surface.

* * * * *